United States Patent
Mathur et al.

(10) Patent No.: US 12,494,237 B2
(45) Date of Patent: Dec. 9, 2025

(54) CLOCK CIRCUITRY FOR MEMORY APPLICATIONS

(71) Applicant: Arm Limited, Cambridge (GB)

(72) Inventors: Rahul Mathur, Austin, TX (US);
Sanjay Mangal, Austin, TX (US);
Hemavathi Chaya, Bangalore (IN);
Kyung Woo Kim, Austin, TX (US);
Pratik Ghanshambhai Satasia, Cedar Park, TX (US); Edward Martin McCombs, Jr., Austin, TX (US)

(73) Assignee: Arm Limited, Cambridge (GB)

(*) Notice: Subject to any disclaimer, the term of this patent is extended or adjusted under 35 U.S.C. 154(b) by 96 days.

(21) Appl. No.: 18/113,438

(22) Filed: Feb. 23, 2023

(65) Prior Publication Data
US 2024/0290363 A1    Aug. 29, 2024

(51) Int. Cl.
*G11C 7/22* (2006.01)
*G11C 11/418* (2006.01)
*G11C 11/419* (2006.01)

(52) U.S. Cl.
CPC ............ *G11C 7/222* (2013.01); *G11C 11/418* (2013.01); *G11C 11/419* (2013.01)

(58) Field of Classification Search
CPC ...... G11C 7/222; G11C 11/418; G11C 11/419
USPC ........................................................ 365/205
See application file for complete search history.

(56) References Cited

U.S. PATENT DOCUMENTS

| | | | |
|---|---|---|---|
| 6,351,756 B1* | 2/2002 | Taniyoshi | H03K 5/00006 708/103 |
| 10,008,260 B1 | 6/2018 | Maiti et al. | |
| 10,497,414 B1 | 12/2019 | Mathur et al. | |
| 2004/0240299 A1* | 12/2004 | Fujimoto | G11C 11/406 365/222 |

FOREIGN PATENT DOCUMENTS

WO    2004-088667 A1    10/2004

OTHER PUBLICATIONS

PCT International Search Report and Written Opinion, PCT/GB2024/050317; Apr. 22, 2024.
Mathur, et al.; 5GHz SRAM for High-Performance Compute Platform in 5nm CMOS; 2022 IEEE Custom Integrated Circuits Conference (CICC); Apr. 2022. DOI: 10.1109/CICC53496.2022.9772840.

* cited by examiner

*Primary Examiner* — Amir Zarabian
*Assistant Examiner* — Daniel J King
(74) *Attorney, Agent, or Firm* — Pramudji Law Group PLLC; Ari Pramudji (57) ABSTRACT

Various implementations described herein are related to a device with a first clock generator that provides a first pulse signal based on a clock signal, wherein the first clock generator has a first tracking circuit that provides a first reset signal based on the first pulse signal. The device may include a second clock generator that provides a second pulse signal based on the clock signal, wherein the second clock generator has a second tracking circuit that provides a first control signal based on the second pulse signal. Also, the device may include a third clock generator that provides a third pulse signal based on the first reset signal, wherein the third clock generator has a logic circuit that provides a second control signal based on the third pulse signal.

20 Claims, 4 Drawing Sheets

CLOCK CIRCUITRY FOR MEMORY APPLICATIONS

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some conventional memory designs, system-level cache has fundamentally different trade-offs and optimization requirements for memory circuit designers compared to smaller level cache memory (e.g., L0, L1, etc.). For instance, some system-level cache memories may include multi-cycle memory access with a regular read/write operation that typically requires two system clock cycles and burst read operations that require up to five system clock cycles. In some modern memory designs, when a designer implements a memory instance at chip level, additional buffers in the data path tend to cause excessive timing delays due to hold constraints from data retention delays of the memory, and the additional buffers also increase on-chip area consumption, which typically cause area and performance deficiencies. Thus, in modern memory designs, there currently exists a need to improve physical memory design implementations of system-level cache memories so as to thereby provide for more efficient clock generation operations.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 2:
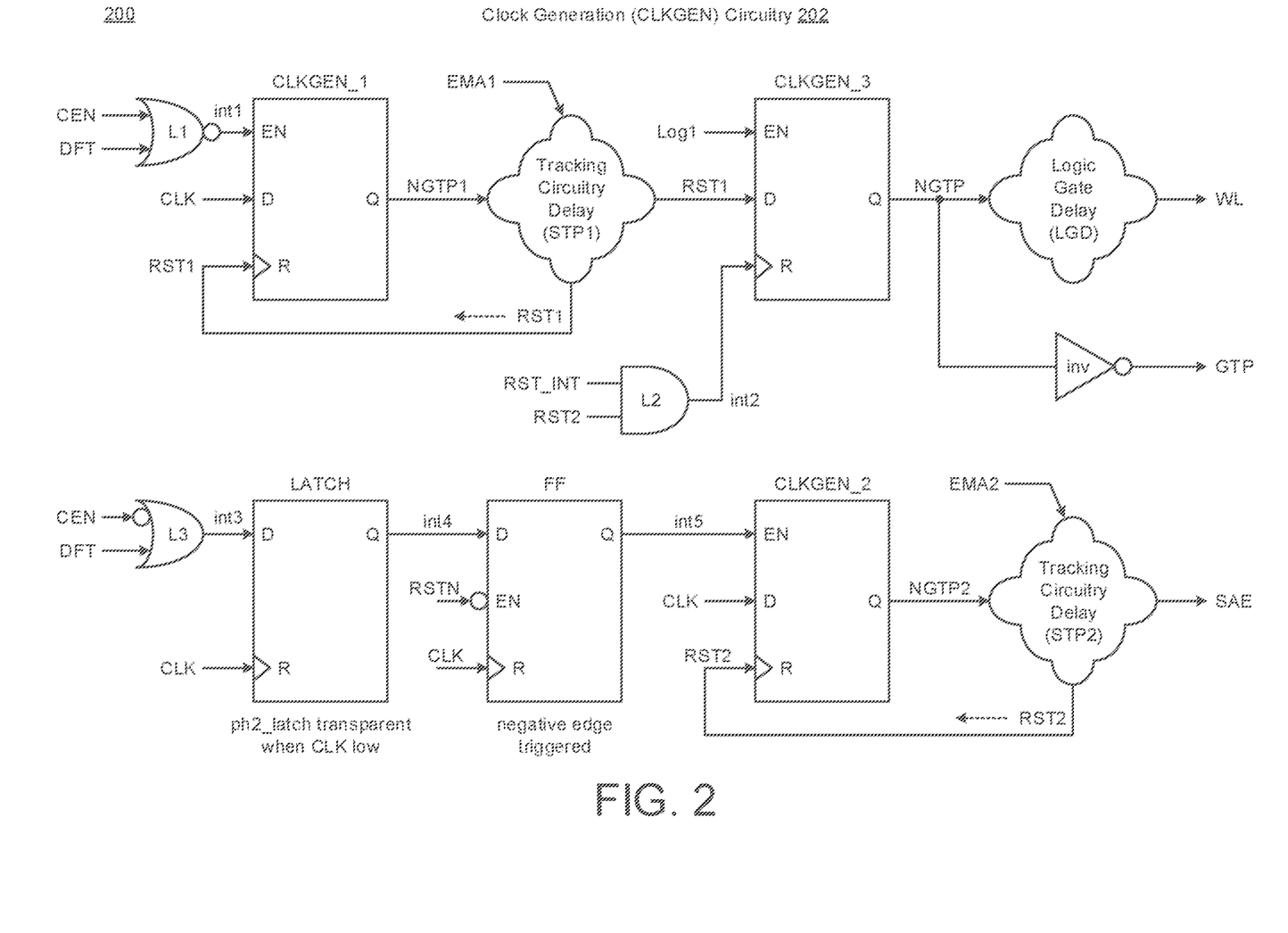
FIG. 2 illustrates a diagram of clock generation circuitry in accordance with various implementations described herein.
Figure 3:
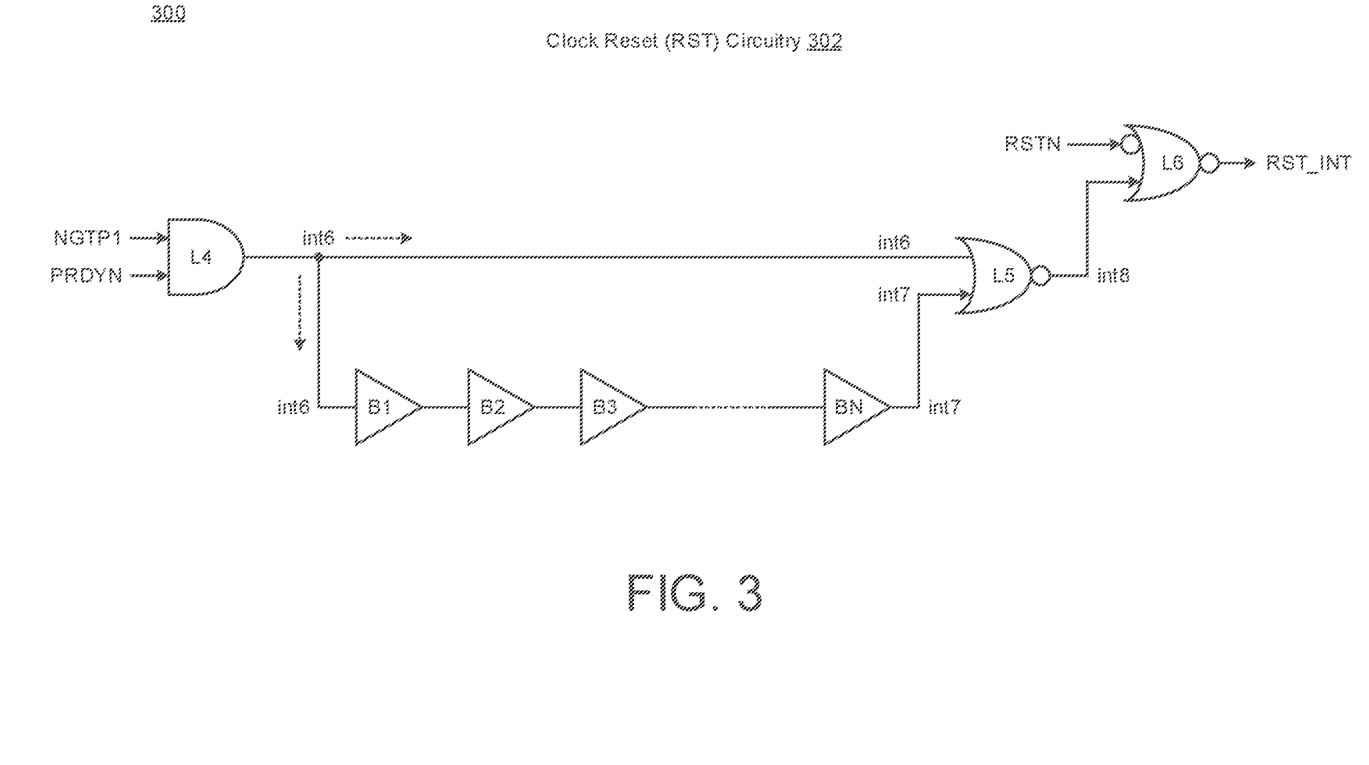
FIG. 3 illustrates a diagram of clock reset circuitry in accordance with various implementations described herein.

Various implementations described herein relate to clock generation schemes and techniques that may improve memory access operations in various physical memory layout designs. For instance, clock generation schemes and techniques described herein provide for a system or a device having unique memory architecture with clock generation circuitry for generating and/or re-setting internal memory clock for various internal memory applications, such as, e.g., system-level cache memories. Thus, various clock generation schemes and techniques described herein may be used as novel circuitry for generating and re-setting the internal memory clock of system-level cache (SLC). Also, the internal memory clock for SLC, which may also be referred to as a global timing pulse (GTP), may be generated with assist from two other internal self-timed clocks (e.g., NGTP1, NGTP2), e.g., by way of a circuit implementation as shown in FIGS. 2-3.

Various implementations of clock generation schemes and techniques will now be described in greater detail herein with reference to FIGS. 1-4.

Figure 1:
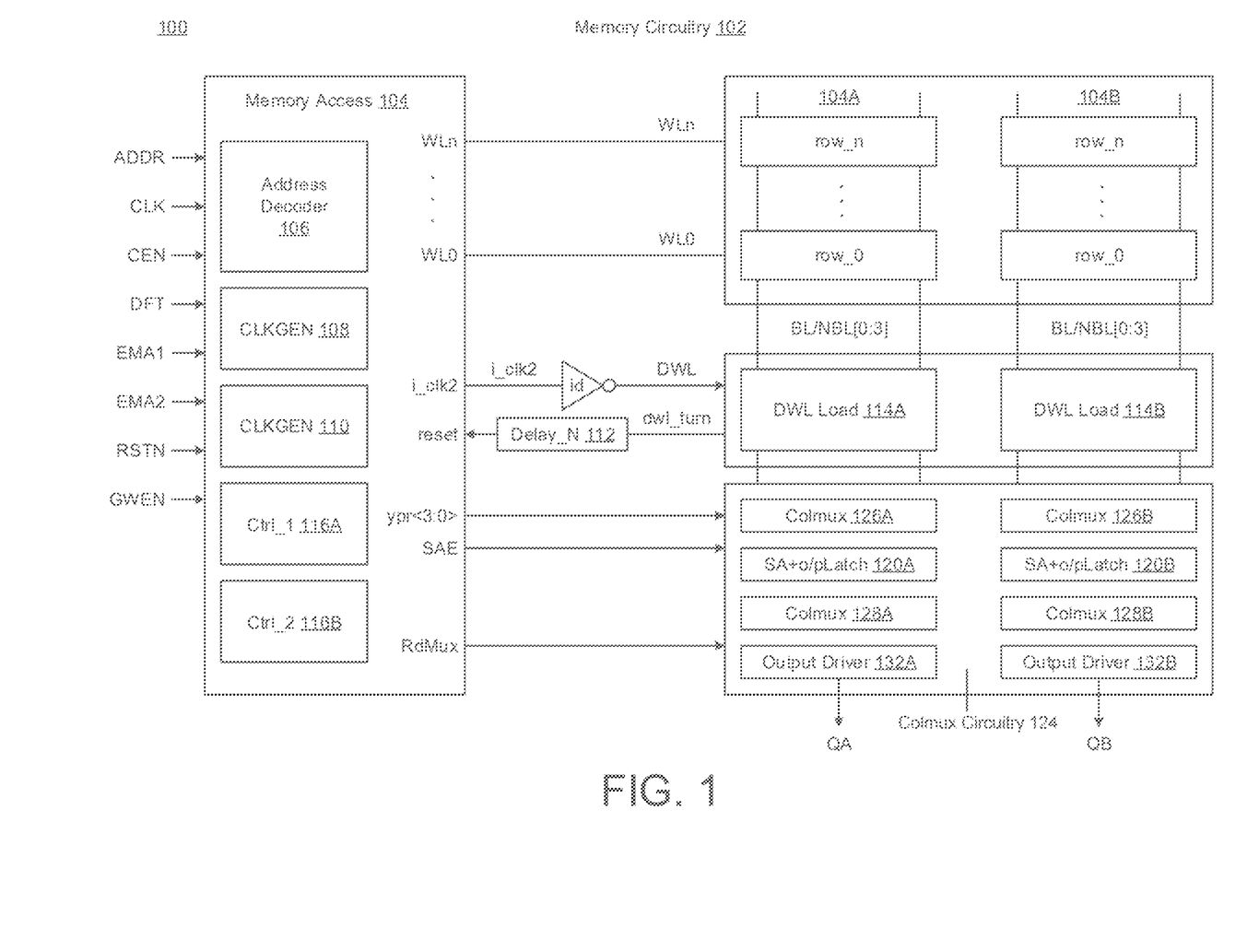
FIG. 1 illustrates a diagram of memory circuitry in accordance with various implementations described herein.

FIG. 1 illustrates a diagram 100 of memory circuitry 102 in accordance with various implementations described herein.

In various implementations, the memory circuitry 102 may be implemented as a system or a device having various integrated circuit (IC) components that are arranged and coupled together as an assemblage or combination of parts that provide for a physical circuit design and related structures. In some instances, a method of designing, providing and building the memory circuitry 102 as an integrated system or device that may involve use of various IC circuit components described herein so as to thereby implement clock generation schemes and techniques associated therewith. The memory circuitry 102 may be integrated with computing circuitry and related components on a single chip, and also, the memory circuitry 102 may be implemented in some embedded systems for electronic, mobile and Internet-of-things (IoT) applications, including sensor nodes.

As shown in FIG. 1, the memory circuitry 102 may be referred to as memory architecture having various circuitry including memory access circuitry 104, an address decoder 106, multiple banks of bitcell arrays 104A, 104B, clock generation circuitry 108, 110, column multiplexer circuitry 124, and dummy wordline (DWL) circuitry associated with DWL loads 114A, 114B. Also, the column multiplexer circuitry 124 may have column multiplexers 126A, 126B, 128A, 128B, sense amplifiers 120A, 120B, and output drivers 132A, 132B. The memory circuitry 102 may have various control circuitry, such as, e.g., first control logic 116A and second control logic 116B. The memory circuitry 102 may have dummy wordline (DWL) driver (id), dummy wordline (DWL) loads 114A, 114B, and delay logic (Delay_N) 112 coupled to the dummy wordline DWL. The output drivers 132A, 132B may include a first output driver 132A configured to provide a first output data signal (QA) and a second output driver 132B configured to provide a second data output signal (QB). Also, the memory access circuitry 104 may include the address decoder 106, the clock generation (CLKGEN) circuitry 108, 110, and control logic 116A, 116B.

The address decoder 106 may be coupled to the multiple banks of bitcell arrays 104A, 104B via wordlines (WL0, . . . , WLn). The multiple banks of bitcell arrays 104A, 104B may include a first bitcell array 104A and a second bitcell array 104B that is different than the first bitcell array 104A, and each bitcell array 104A, 104B may have multiple rows of bitcells row_0, . . . , row_n. The column multiplexers (Colmux) 126A, 126B, 128A, 128B and the sense amplifiers 120A, 120B may be coupled to each of the bitcells in each of the rows of bitcells row_0, . . . , row_n via complementary bitlines (BL/NBL[0:3]). Each bitcell array 104A, 104B may use a number of inverted wordlines (e.g., nwl_0, . . . , nwl_n) that are coupled between address decoder 106 and corresponding rows of bitcells row_0, . . . , row_n for access to each of the bitcells based on selected wordlines. Also, each of the wordlines (WL0, . . . , WLn) may have a corresponding wordline driver (not shown) coupled thereto to provide wordlines signals (e.g., wl_0, . . . , wl_n) to corresponding rows of bitcells row_0, . . . , row_n. In some instances, the sense amplifiers (SA) 120A, 120B may include output latch circuitry (o/pLatch).

The memory circuitry 102 may receive clock signal (CLK) and an address signal ADDR, and the memory circuitry 102 may include clock generation circuitry (CLK-GEN) 108, 110, wherein CLKGEN 108 may receive the clock signal (CLK) and then provide the CLK signal to CLKGEN 110, e.g., as a pass-thru signal. The clock generation circuitry (CLKGEN) 110 receives the clock signal (CLK) and provides one or more internal clock signals, such as, e.g., a first internal clock signal i_clk1 (not shown) to address decoder 106 and also a second internal clock signal i_clk2 to dummy wordline driver (e.g., inverter id) via dummy wordline (DWL). Also, DWL loads 114A, 114B may receive the DWL signal from the DWL driver (id) and provide a DWL turn signal (dwl_turn) to delay logic (Delay_N) 112, and also, delay logic (Delay_N) 112 may provide a reset signal to CLKGEN circuitry 110. Also, in various instances, the address decoder 106 may receive multiple signals including, e.g., the address signal ADDR, the first internal clock signal i_clk1, and the wordline control signal (WL), and then access at least one wordline (e.g., WL0, . . . , WLn) based on the received address signal ADDR.

The clock generation circuitry (CLKGEN) 108 may receive multiple input signals including, e.g., clock signal (CLK), chip enable signal (CEN), design-for-test signal (DFT), one or more extra margin adjust signals (EMA1, EMA2), and inverted reset signal RSTN, which is based on non-inverted reset signal RST. Also, the CLKGEN circuitry 108 may receive clock signal (CLK) and provide the clock signal (CLK) to the CLKGEN circuitry 110 as a pass-thru signal. Also, the CLKGEN circuitry 108 may provide the global timing pulse signal (GTP), the sense amplifier enable signal (SAE), and wordline control signal (WL) based on one or more of input signals (e.g., CLK, CEN, DFT, EMA1, EMA2, RSTN). For instance, in various applications, the CLKGEN circuitry 108 may provide the WL signal to address decoder 106, the CLKGEN circuitry 108 may provide the GTP signal to the first control logic 116A, and also, the CLKGEN circuitry 108 may provide the GTP signal and SAE signal to the second control logic 116B. Also, various features, behaviors and characteristics related to clock generation circuitry (CLKGEN) 108 will be described in greater detail herein in reference to FIGS. 2-4.

The memory circuitry 102 includes the first control logic 116A, which is coupled between the clock generation circuitry (CLKGEN) 110 and column multiplexers (Colmux) 126A, 126B, 128A, 128B. The first control logic 116A may receive a global timing pulse (GTP), receive a column address signal, receive a global write enable signal (GWEN), and provide various timing and control signals (ypr<3:0>, SAE) to the column multiplexers 126A, 126B, 128A, 128B and the sense amplifiers 120A, 120B. For instance, the memory circuitry 102 may utilize the first control logic 116A to provide y-mux signals (ypr<3:0>) to the column multiplexers 126A, 126B, 128A, 128B and also provide a sense amplifier enable signal (SAE) to the sense amplifiers 120A, 120B.

The memory circuitry 102 may include the second control logic 116B, which is coupled to the column multiplexers (Colmux) 128A, 128B. The second control logic 116B may receive the global timing pulse (GTP), receive a column address, receive a the sense amplifier enable signal (SAE), and provide a read multiplexer signal (RdMux) to column multiplexers 128A, 128B. For instance, in some implementations, the memory circuitry 102 may utilize the second control logic 116B to provide the read multiplexer signal (RdMux) to the column multiplexers 128A, 128B.

In various implementations, each bitcell in the bitcell arrays 104A, 104B may be referred to as a memory cell, and each bitcell may be configured to store at least one data bit value (e.g., a data value associated with logical '0' or '1'). Each row of bitcells row_0, . . . , row_n in the bitcell arrays 104A, 104B may include any number of memory cells arranged in various configurations, such as, e.g., a two-dimensional (2D) memory array having columns and rows of multiple bitcells arranged in a 2D grid pattern. Also, each bitcell may be implemented with random access memory (RAM) circuitry, or some other type of volatile type memory. In some instances, each memory cell may include a multi-transistor static RAM (SRAM) cell, including various types of SRAM cells, such as, e.g., 6T CMOS SRAM and/or other types of complementary MOS (CMOS) SRAM cells, such as, e.g., 4T, 8T, 10T, or more transistors per bit.

In some instances, the memory circuitry 102 may refer to memory architecture having multiple bitcell arrays (e.g., 104A, 104B), and the memory circuitry 102 may include column multiplexer circuitry (e.g., Colmux 124) that is coupled to the memory architecture via the multiple bitlines (e.g., BL/NBL<0:3>) for read access operations. Also, the column multiplexer circuitry (e.g., 124) may be configured to perform read access operations in the multiple bitcell arrays (e.g., 104A, 104B) via the bitlines (e.g., BL/NBL<0:3>) based on a sense amplifier enable signal (e.g., SAE) and a read multiplexer signal (e.g., RdMux). In addition, the memory circuitry 102 may include control circuitry (e.g., 116A, 116B) that is configured to provide the read multiplexer signal (e.g., RdMux) to the column multiplexer circuitry (e.g., 124) based on a clock signal (e.g., GTP) and the sense amplifier enable signal (e.g., SAE) so that the column multiplexer circuitry (e.g., 124) is able to perform the read access operations in the multiple bitcell arrays (e.g., 104A, 104B).

FIG. 2 illustrates a schematic diagram 200 of clock generation circuitry 202 in accordance with various implementations described herein. In various applications, the clock generation circuitry 202 in FIG. 2 may be implemented and utilized as the clock generation circuitry (CLK-GEN) 108 in the memory circuitry 102 in FIG. 1.

In various implementations, clock generation circuitry 202 may be implemented as a system or device having various integrated circuit (IC) components that are arranged and coupled together as an assemblage or combination of parts that provide for a physical circuit design and related structures. In some instances, a method of designing, providing and building the clock generation circuitry 202 as an integrated system or device that may involve use of various IC circuit components described herein so as to thereby implement various clock generation schemes and techniques associated therewith. Also, the clock generation circuitry 202 may be integrated with various computing circuitry and/or related components on a single chip, and the clock generation circuitry 202 may be implemented in various embedded systems and/or devices for electronic, mobile and Internet-of-things (IoT) applications, including remote sensor nodes.

As shown in FIG. 2, the clock generation circuitry 202 may include a first clock generator (CLKGEN_1) that provides a first pulse signal (NGTP1) based on a clock signal (CLK), wherein the first clock generator (CLKGEN_1) includes first tracking circuit (STP1) that provides a first reset signal (RST1) based on the first pulse signal (NGTP1).

In some applications, the first pulse signal (NGTP1) may refer to a first inverted global timing pulse signal. Also, the first tracking circuitry (STP1) may be referred to as a first tracking circuitry delay that is activated with a first extra margin adjust signal (EMA1) and provides the first reset signal (RST1) to the clock generators (CLKGEN_1, CLK-GEN_3). Further, in some applications, the first clock generator (CLKGEN_1) may be implemented with a first latch or first flip-flop, such as, e.g., a first D flip-flop (DFF), or similar logic. In some applications, the first tracking circuitry (STP1) may refer to a first self-timing path (1st STP) that may be configured to provide the wordline control signal (WL) as an output signal.

Also, the clock generation circuitry 202 may include a second clock generator (CLKGEN_2) that provides a second pulse signal (NGTP2) based on the clock signal (CLK), wherein the second clock generator (CLKGEN_2) has a second tracking circuit (STP2) that provides a first control signal (SAE) based on the second pulse signal (NGTP2). In some applications, the second pulse signal (NGTP2) may refer to a second inverted global timing pulse signal. Also, the first control signal (SAE) may refer to a sense amplifier enable signal. Also, the second tracking circuit (STP2) may be coupled to the memory circuitry 102 in FIG. 1 that performs read-write (RW) operations based on the first control signal (SAE) and/or the second control signal (WL). Also, the second tracking circuitry (STP2) may be referred to as a second tracking circuitry delay that is activated with a second extra margin adjust signal (EMA2) and then provides a second reset signal to the clock generator (CLKGEN_2) and also provides the first control signal (SAE) to the memory circuitry 102 in FIG. 1. Also, in some applications, the second clock generator (CLKGEN_2) may be implemented with a second latch or second flip-flop, such as e.g., a second D flip-flop (DFF), or similar logic for various similar applications. Also, in some applications, the second tracking circuitry (STP2) may refer to a second self-timing path (2nd STP) that may be configured to provide the sense amplifier enable signal (SAE) and the second reset signal (RST2) as output signals.

Also, the clock generation circuitry 202 may include a third clock generator (CLKGEN_3) that provides a third pulse signal (NGTP) based on the first reset signal (RST1), wherein the third clock generator (CLKGEN_3) has a logic circuitry (LGD) that provides a second control signal (WL) based on the third pulse signal (NGTP). In some applications, the third pulse signal (NGTP) may refer to a third inverted global timing pulse signal, wherein the global timing pulse signal (GTP) may be provided by an inverter (inv) that receives the NGTP signal and then provides the GTP signal. Also, the second control signal (WL) may refer to a wordline control signal, such as described in FIG. 1. Also, the logic circuitry (LGD) may be coupled to the memory circuitry 102 in FIG. 1 that performs read-write (RW) operations based on the first control signal (SAE) and/or the second control signal (WL). Also, the logic circuitry (LGD) may be referred to as a logic gate delay (LGD) that receives the NGTP signal and provides the WL signal to the memory circuitry 102 in FIG. 1. Also, in some applications, the third clock generator (CLKGEN_3) may be implemented with a third latch or third flip-flop, such as e.g., a third D flip-flop (DFF), or similar logic for various similar applications.

Figure 4:
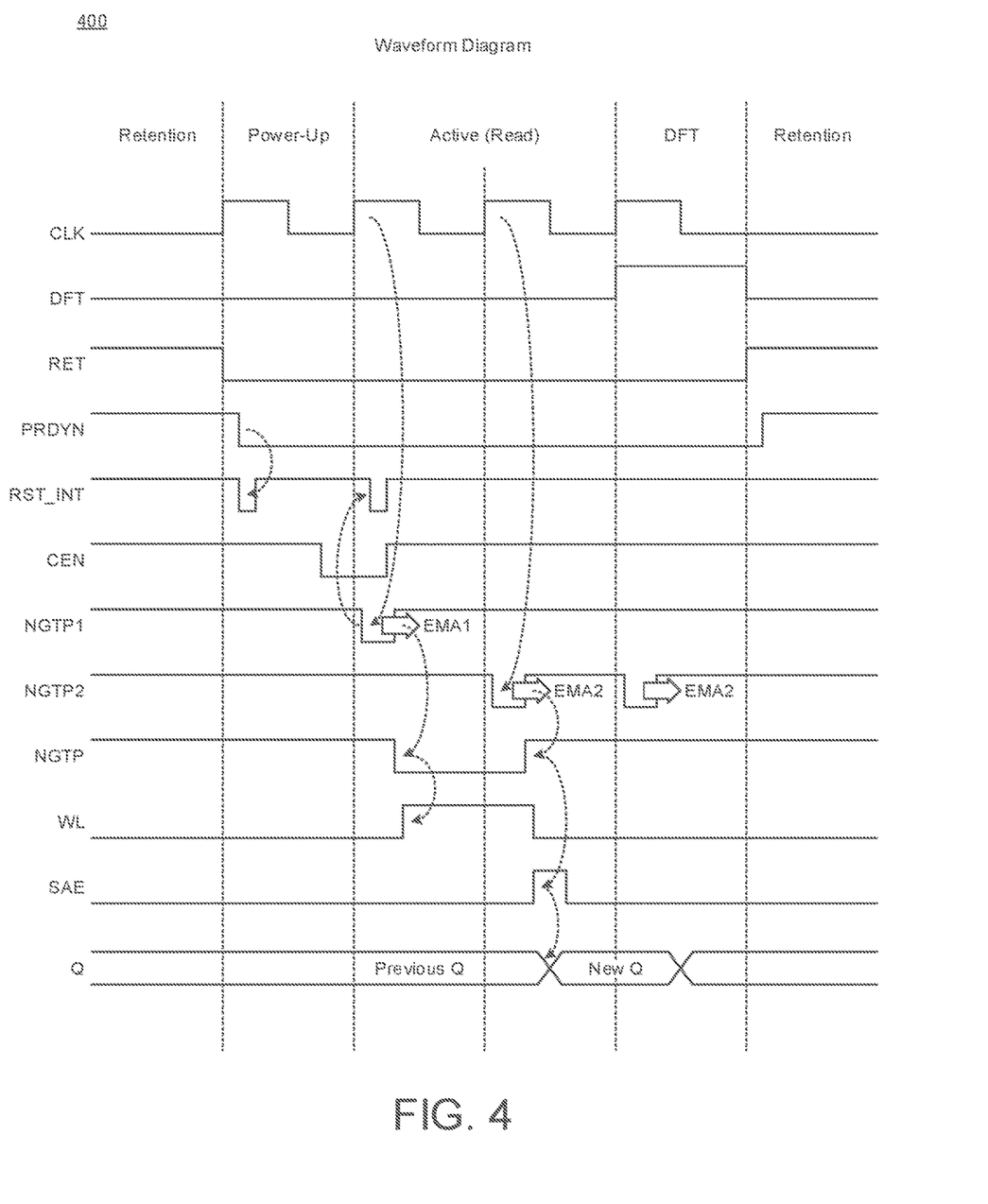
FIG. 4 illustrates a waveform diagram related to operating clock generation circuitry in accordance with various implementations described herein.

In some implementations, as shown and described in reference to FIG. 4, the first control signal (SAE) may be active in a first clock cycle of the clock signal (CLK) so as to thereby provide the sense amplifier enable signal (SAE) in the first clock cycle of the clock signal (CLK) for performing read-write (RW) operations by the memory circuitry 102 in FIG. 1. Also, the second control signal (WL) may be active in a second clock cycle of the clock signal (CLK) so as to thereby provide the wordline control signal (WL) in the second clock cycle of the clock signal (CLK) for performing read-write (RW) operations by the memory circuitry in FIG. 1.

In various implementations, the clock generation circuitry 202 may have various logic circuitry (e.g., LATCH, FF, L1, L2, L3) that may be coupled to the clock generators (CLKGEN_1, CLKGEN_2, CLKGEN_3). For instance, logic gate (L1) may receive input signals (CEN, DFT) and provide an inverted intermediate signal (int1) to an enable input (EN) of the first clock generator (CLKGEN_1). As such, CLKGEN_1 may receive input signals (int1, CLK, RST1) at corresponding inputs (EN, D, R) and then provide the NGTP1 signal as output (Q) to the STP1 circuitry. Also, logic gate (L2) may receive input signals (RST_INT, RST2) and provide an intermediate signal (int2) to a reset (R) input of the third clock generator (CLKGEN_3). Thus, CLKGEN_3 may receive input signals (log 1, RST1, int2) at corresponding inputs (EN, D, R) and then provide the NGTP signal as output (Q) to the LGD circuitry. In some applications, the log 1 signal refers to a logic one (1) signal, logic high signal, or a voltage source (VDD) signal. Also, various features, behaviors and characteristics related to generating the RST_INT signal will be described in greater detail herein in reference to FIG. 3.

Also, in various implementations, logic gate (L3) may receive input signals (not CEN, DFT) and provide an intermediate signal (int3) to a data input (D) of a latch (LATCH). As such, the latch (LATCH) may receive input signals (int3, CLK) at corresponding inputs (D, R) and then provide an intermediate signal (int4) as output (Q) to a flip-flop (FF). Also, in some instances, the flip-flop (FF) may receive input signals (int4, not RSTN, CLK) and provide an intermediate signal (int5) to an enable input (EN) of the second clock generator (CLKGEN_2). As such, the flip-flop (FF) may receive input signals (int4, not RSTN, CLK) at corresponding inputs (D, EN, R) and then provide the intermediate signal (int5) as output (Q) to the second clock generator (CLKGEN_2). Further, CLKGEN_2 may receive input signals (int5, CLK, RST2) at corresponding inputs (EN, D, R) and then provide the NGTP2 signal as output (Q) to the STP2 circuitry. Also, in various applications, the latch (LATCH) may refer to a ph2_latch that is transparent when the clock signal (CLK) is low. In addition, the flip-flop (FF) may be negative edge triggered.

In some applications, the logic gate (L1) may be implemented with a NOR gate, the logic gate (L2) may be implemented with an AND gate, and the logic gate (L3) may be implemented with an OR gate having an inverting input. Also, in some instances, logic gate (L1) may be implemented with an OR gate having an inverting output.

FIG. 3 illustrates a diagram 300 of clock reset circuitry 302 in accordance with various implementations described herein. In some applications, the clock reset circuitry 302 in FIG. 3 may be implemented and utilized to generate and provide the intermediate reset signal (RST_INT) as shown in the clock generation circuitry 202 in FIG. 2.

In various implementations, the clock reset circuitry 302 may be implemented as a system or device having various integrated circuit (IC) components that are arranged and coupled together as an assemblage or combination of parts that provide for a physical circuit design and related structures. In some instances, a method of designing, providing and building clock reset circuitry 302 as an integrated system or device that may involve use of various IC circuit components described herein so as to thereby implement various clock generation schemes and techniques associated therewith. Also, clock reset circuitry 302 may be integrated with various computing circuitry and/or related components on a single chip, and the clock reset circuitry 302 may be implemented in various embedded systems and/or devices for electronic, mobile and IoT applications.

In various implementations, as shown in FIG. 3, the clock reset circuitry 302 may include various logic circuitry (L4, L5, L6) along with a number (N) of series-coupled buffers (B1, B2, B3, . . . , BN) that provide a signal delay path. In some applications, logic gate (L4) may receive input signals (NGTP1, PRDYN) and then provide an intermediate signal (int6) to logic gate (L5) and a first buffer (B1). Also, the NGTP1 signal is provided by the CLKGEN_1 of the clock generation circuitry 202 in FIG. 2, and also, the PRDYN signal may refer to a power ready signal. Also, the series-coupled buffers (B1, B2, B3, . . . , BN) may provide the signal delay path as an intermediate signal (int7). Also, logic gate (L5) may receive input signals (int6, int7) and then provide an intermediate signal (int8) to logic gate (L6). Also, logic gate (L6) may receive input signals (not RSTN, int8) and then provide the intermediate reset signal (RST_INT) to logic gate (L2) of the clock generation circuitry 202 in FIG. 2.

In various applications, logic gate (L4) may be implemented with an AND gate, logic gate (L5) may be implemented with a NOR gate, and also, logic gate (L6) may be implemented with a NOR gate having an inverting input. Also, in various instances, logic gates (L6) may be implemented with OR gates having an inverting output, wherein logic OR gate (L6) has at least one inverting input along with an inverting output.

FIG. 4 illustrates waveform diagram 400 related to operating clock generation circuitry 202 in FIG. 2 and clock reset circuitry 302 in FIG. 3 in accordance with various implementations described herein. For instance, in various applications, clock generation circuitry 202 in FIG. 2 and clock reset circuitry 302 in FIG. 3 may be used to describe the various timing periods (e.g., Retention, Power-Up, Active (Read), DFT, Retention) of the waveform diagram 400 shown in FIG. 4.

As shown in FIG. 4, the waveform diagram 400 shows multiple timing periods (Retention, Power-Up, Active (Read), DFT, Retention) that depict the signal triggering of clock generation circuitry 202 in FIG. 2 and clock reset circuitry 302 in FIG. 3. Also, in various instances, the clock signal (CLK) may refer to a single pulse within each timing period (Retention, Power-Up, Active (Read), DFT, Retention). For instance, during timing period for Power-Up, CLK signal may trigger inverted retention signal (RET), and during timing period for DFT, CLK signal may trigger DFT signal. Also, during timing period for Power-Up, the CLK signal and the PRDYN signal may trigger the RST_INT signal.

Also, in various implementation, during timing period for Active (Read), a first cycle of the CLK signal triggers the NGTP1 signal, and the EMA1 signal then triggers the starting edge of the NGTP signal, which then triggers the starting edge of the WL signal. In some instances, the starting edge of the EMA1 signal may trigger the starting edge of the RST_INT signal. Also, during timing period for Active (Read), a second cycle of the CLK signal triggers the NGTP2 signal, and the EMA2 signal then triggers the ending edge of the NGTP signal, which then triggers the starting edge of the SAE signal. Also, during timing periods for Retention, Power-Up and Active (Read), the Q output for data remains in the previous Q logic state until the WL signal deactivates and the SAE signal activates, wherein the new Q logic state is achieved by toggling from the previous Q logic state into the new Q logic state. In some applications, during timing period for DFT, the new Q logic state may again toggle into a new logic state.

In some implementations, in reference to FIGS. 1-4, various clock generation schemes and techniques described herein may be implemented in a device with multiple clock generators, including, e.g., a first clock generator, a second clock generator, and a third clock generator. For instance, in various applications, the first clock generator may provide a first triggering pulse based on a clock signal, the second clock generator may provide a second triggering pulse based on the clock signal; and the third clock generator may provide a global timing pulse that is activated based on the first triggering pulse and deactivated based on the second triggering pulse.

In various applications, the second clock generator may generate and provide the second triggering pulse after the first clock generator generates and provides the first triggering pulse. Also, the first clock generator may provide the first triggering pulse during a first clock cycle of the clock signal, and then the second clock generator may provide the second triggering pulse during a second clock cycle of the clock signal. Also, the first clock generator may provide the first triggering pulse during a set operation (SET) so as to activate a starting edge of the global timing pulse when triggered by a first clock cycle the clock signal, and also, the second clock generator may provide the second triggering pulse during a reset operation (RST or RESET) so as to deactivate an ending edge of the global timing pulse when triggered by a second clock cycle of the clock signal.

In various applications, the first clock generator may have a first tracking circuit that provides a first reset signal based on the first triggering pulse, the second clock generator may have a second tracking circuit that provides a sense amplifier enable signal based on the second triggering pulse, and also, the third clock generator may have a logic circuit that provides a wordline signal based on the global timing pulse. The logic circuit and the second tracking circuit may be coupled to memory circuitry that performs read-write operations based on the sense amplifier enable signal and the wordline signal. The first clock generator may be implemented with a first flip-flop, the second clock generator maybe implemented with a second flip-flop, and also, the third clock generator may be implemented with a third flip-flop.

In some implementations, in reference to FIGS. 1-4, various clock generation schemes and techniques described herein may be implemented in a device with multiple clock generators, including, e.g., a first clock generator, a second clock generator, and a third clock generator. For instance, in various applications, a first clock generator may provide an activation pulse for a set operation so as to trigger a starting edge of a global timing pulse when activated by a first clock cycle the clock signal. Also, a second clock generator that provides a deactivation pulse for a reset operation so as to trigger an ending edge of the global timing pulse when deactivated by a second clock cycle of the clock signal. Also, a third clock generator that provides the global timing pulse based on activation by the activation pulse and based on deactivation by the deactivation pulse.

In various applications, the global timing pulse may have a pulse length defined by and between the starting edge and the ending edge, and also, the pulse length may be selectively extended based on delaying deactivation of the ending edge. Also, the first clock generator may have a first tracking circuit that provides a first reset signal based on the activation pulse, the second clock generator may have a second tracking circuit that provides a sense amplifier enable signal based on the deactivation pulse, and also, the third clock generator may have a logic circuit that provides a wordline signal based on the global timing pulse. Also, the logic circuit and the second tracking circuit may be coupled to memory circuitry that is configured to perform read-write operations based on the sense amplifier enable signal and the wordline signal.

In various applications, the memory circuitry may have an array of bitcells, an address decoder, and a sense amplifier, wherein the array of bitcells are accessible via wordlines and bitlines, and wherein the address decoder is coupled to the bitcells via the wordlines, and wherein the sense amplifier is coupled to the bitcells via the bitlines. Also, the sense amplifier enable signal may be active in a first clock cycle of the clock signal so as to control the sense amplifier in the first clock cycle while performing read-write operations by the memory circuitry. Also, the wordline signal is active in a second clock cycle of the clock signal so as to control the address decoder in the second clock cycle while performing read-write operations by the memory circuitry. In some applications, the first clock generator may be implemented with a first flip-flop, the second clock generator may be implemented with a second flip-flop, and also, the third clock generator may be implemented with a third flip-flop.

In some implementations, in reference to FIGS. 1-4, various clock generation schemes and techniques described herein may be implemented in a device with multiple clock generators that are utilized to generate the global timing pulse (GTP) along with the wordline control signal (WL) and/or the sense amplifier enable signal (SAE). For instance, in reference to the GTP1/NGTP1 signal, rise transition may be caused by the rising edge of the first system clock (NGTP1) and the DFT low condition, which may be used to trigger the start of the bitline precharge operation. Also, fall transition caused by self-timed path (STP1) may be used to trigger end of the bitline precharge operation and may also trigger start of GTP pulse. Also, the GTP start may be used to trigger the WL rise, wherein STP1 includes gate and RC tracking delay, and STP1 may be externally controlled by way of the EMA1 bus. Also, the DFT may allow for extension of the bitline precharge operation, if required in silicon testing. Also, in reference to GTP2, the rise transition caused by the rising edge of second system clock (NGTP2) or DFT high condition may be used for fall transition caused by self-timed path (STP2), which triggers end of the GTP pulse. Also, GTP fall may be used to trigger WL fall and SAE rise. Also, STP2 may include a number of gate delays, wherein STP2 may be externally controlled by way of the EMA2 bus, which may allow for extension of read/write operation, if required in silicon testing.

One advantage of the various implementations described herein is that the GTP pulse (and thereby WL pulse) may be controlled externally by way of system clock (CLK) frequency. Thus, as a result, memory read and write margins may be improved by slowing down the system clock (CLK) frequency. Otherwise, GTP is not a self-resetting signal as its start is triggered by GTP1 fall, and fall is dependent upon GTP2 fall. Thus, in various scenarios, where GTP1 pulse happens but GTP2 pulse does not happen, then GTP may not reset, and therefore, an internal reset signal (RESET_INT) may be generated with the following control signals, as shown, e.g., in the circuit implementation of FIG. 2. In some instances, as shown in reference to FIG. 2, the circuit may automatically generate a low pulse for NGTP1 at the start of any active (read/write/burst) operation using the behaviors and characteristics based on NGTP1 information. This concept may cover for an instance where there is a glitch on the CLK with CEN low, which may occur in parallel to the bitline precharge operation, and may result in no penalty to memory access/cycle timing. Also, in reference to RESETN, the user may externally strobe this signal (low pulse) at any time to reset GTP, and also, in reference to PRDYN, the circuit may automatically generate a low pulse upon wakeup from retention (RET) mode, and also, the circuit may use existing memory output signal for PRDYN related information.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device including a first clock generator that provides a first pulse signal based on a clock signal, wherein the first clock generator has a first tracking circuit that provides a first reset signal based on the first pulse signal. The device may include a second clock generator that provides a second pulse signal based on the clock signal, wherein the second clock generator has a second tracking circuit that provides a first control signal based on the second pulse signal. Also, the device may include a third clock generator that provides a third pulse signal based on the first reset signal, wherein the third clock generator has a logic circuit that provides a second control signal based on the third pulse signal.

Described herein are various implementations of a device including a first clock generator that provides a first triggering pulse based on a clock signal. The device may include a second clock generator that provides a second triggering pulse based on the clock signal. The device may include a third clock generator that provides a global timing pulse that is activated based on the first triggering pulse and deactivated based on the second triggering pulse.

Described herein are various implementations of a device including a first clock generator that provides an activation pulse for a set operation so as to trigger a starting edge of a global timing pulse when activated by a first clock cycle the clock signal. The device may include a second clock generator that provides a deactivation pulse for a reset operation so as to trigger an ending edge of the global timing pulse when deactivated by a second clock cycle of the clock signal. The device may include a third clock generator that provides the global timing pulse based on activation by the activation pulse and based on deactivation by the deactivation pulse.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to various implementations of various schemes and techniques described herein, other and further implementations may be devised and/or developed in accordance with the disclosure herein, which may be determined by the claims that follow. Also, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
a first clock generator that provides a first pulse signal based on a clock signal, wherein the first clock generator has a first tracking circuit that provides a first reset signal based on the first pulse signal;
a second clock generator that provides a second pulse signal based on the clock signal, wherein the second clock generator has a second tracking circuit that provides a first control signal based on the second pulse signal; and
a third clock generator that provides a third pulse signal based on the first reset signal, wherein the third clock generator has a logic circuit that provides a second control signal based on the third pulse signal.

2. The device of claim 1, wherein the first pulse signal comprises a first global timing pulse signal, and wherein the second pulse signal comprises a second global timing pulse signal, and wherein the third pulse signal comprises a third global timing pulse signal.

3. The device of claim 1, wherein the first control signal comprises a sense amplifier enable signal, and wherein the second control signal comprises a wordline signal.

4. The device of claim 1, wherein the logic circuit and the second tracking circuit are coupled to memory circuitry that performs read-write operations based on the first control signal and the second control signal.

5. The device of claim 4, wherein the first control signal is active in a first clock cycle of the clock signal so as to provide a sense amplifier enable signal in the first clock cycle of the clock signal for performing read-write operations by the memory circuitry.

6. The device of claim 4, wherein the second control signal is active in a second clock cycle of the clock signal so as to provide a wordline signal in the second clock cycle of the clock signal for performing read-write operations by the memory circuitry.

7. The device of claim 4, wherein the first clock generator is implemented with a first flip-flop, wherein the second clock generator is implemented with a second flip-flop, and wherein the third clock generator is implemented with a third flip-flop.

8. A device comprising:
a first clock generator that provides a first triggering pulse based on a clock signal;
a second clock generator that provides a second triggering pulse based on the clock signal; and
a third clock generator that provides a global timing pulse that is activated based on the first triggering pulse and deactivated based on the second triggering pulse.

9. The device of claim 8, wherein the second clock generator generates and provides the second triggering pulse after the first clock generator generates and provides the first triggering pulse.

10. The device of claim 8, wherein the first clock generator provides the first triggering pulse during a first clock cycle of the clock signal, and wherein the second clock generator provides the second triggering pulse during a second clock cycle of the clock signal.

11. The device of claim 8, wherein:
the first clock generator provides the first triggering pulse during a set operation so as to activate a starting edge of the global timing pulse when triggered by a first clock cycle of the clock signal, and
the second clock generator provides the second triggering pulse during a reset operation so as to deactivate an ending edge of the global timing pulse when triggered by a second clock cycle of the clock signal.

12. The device of claim 8, wherein:
the first clock generator has a first tracking circuit that provides a first reset signal based on the first triggering pulse,
the second clock generator has a second tracking circuit that provides a sense amplifier enable signal based on the second triggering pulse, and the third clock generator has a logic circuit that provides a wordline signal based on the global timing pulse.

13. The device of claim 12, wherein the logic circuit and the second tracking circuit are coupled to memory circuitry that performs read-write operations based on the sense amplifier enable signal and the wordline signal.

14. The device of claim 12, wherein the first clock generator is implemented with a first flip-flop, wherein the second clock generator is implemented with a second flip-flop, and wherein the third clock generator is implemented with a third flip-flop.

15. A device comprising:
a first clock generator that provides an activation pulse for a set operation so as to trigger a starting edge of a global timing pulse when activated by a first clock cycle of a clock signal;
a second clock generator that provides a deactivation pulse for a reset operation so as to trigger an ending edge of the global timing pulse when deactivated by a second clock cycle of the clock signal; and
a third clock generator that provides the global timing pulse based on activation by the activation pulse and based on deactivation by the deactivation pulse.

16. The device of claim 15, wherein the global timing pulse has a pulse length defined by and between the starting edge and the ending edge, and wherein the pulse length is selectively extended based on delaying deactivation of the ending edge.

17. The device of claim 15, wherein:
the first clock generator has a first tracking circuit that provides a first reset signal based on the activation pulse,
the second clock generator has a second tracking circuit that provides a sense amplifier enable signal based on the deactivation pulse, and
the third clock generator has a logic circuit that provides a wordline signal based on the global timing pulse.

18. The device of claim 17, wherein the logic circuit and the second tracking circuit are coupled to memory circuitry that is configured to perform read-write operations based on the sense amplifier enable signal and the wordline signal.

19. The device of claim 18, wherein:
the memory circuitry includes an array of bitcells, an address decoder, and a sense amplifier,
the array of bitcells are accessible via wordlines and bitlines,
the address decoder is coupled to the bitcells via the wordlines,
the sense amplifier is coupled to the bitcells via the bitlines,
wherein the sense amplifier enable signal is active in a first clock cycle of the clock signal so as to control the sense amplifier in the first clock cycle while performing read-write operations by the memory circuitry, and
wherein the wordline signal is active in a second clock cycle of the clock signal so as to control the address decoder in the second clock cycle while performing read-write operations by the memory circuitry.

20. The device of claim 15, wherein the first clock generator is implemented with a first flip-flop, wherein the second clock generator is implemented with a second flip-flop, and wherein the third clock generator is implemented with a third flip-flop.

* * * * *